US012798388B2

(12) United States Patent
Liu et al.

(10) Patent No.: US 12,798,388 B2
(45) Date of Patent: Nov. 17, 2026

(54) VEHICLE BRAKING METHOD AND APPARATUS

(71) Applicant: Yinwang Intelligent Technologies Co., Ltd., Shenzhen (CN)

(72) Inventors: Donghao Liu, Shanghai (CN); Yixiao Liang, Shenzhen (CN); Yongsheng Zhang, Shanghai (CN); Biao Jin, Shenzhen (CN); Weimiao Yang, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/012,039

(22) Filed: Jan. 7, 2025

(65) Prior Publication Data

US 2025/0145007 A1 May 8, 2025

Related U.S. Application Data

(63) Continuation of application No. PCT/CN2022/104461, filed on Jul. 7, 2022.

(51) Int. Cl.
*B60L 7/26* (2006.01)

(52) U.S. Cl.
CPC ........... *B60L 7/26* (2013.01); *B60L 2240/423* (2013.01)

(58) Field of Classification Search
CPC ........ B60T 8/26; B60T 8/1766; B60T 13/586; B60T 13/662; B60T 2270/606; B60T 2270/608; B60L 7/26; B60L 2240/423
(Continued)

(56) References Cited

U.S. PATENT DOCUMENTS 6,021,365 A * 2/2000 Ishii .......................... B60T 8/00 303/3
8,152,245 B2 * 4/2012 Lubbers ................ B60T 13/586 303/151
(Continued)

FOREIGN PATENT DOCUMENTS

CN 111605527 A 9/2020
CN 112440951 A 3/2021
(Continued)

OTHER PUBLICATIONS

Xu et al., “A regenerative braking control strategy for electric vehicle with four in-wheel motors,” 2016 35th Chinese Control Conference (CCC), TCCT, total 6 pages (Jul. 27-29, 2016).

*Primary Examiner* — Hai H Huynh
*Assistant Examiner* — Johnny H Hoang
(74) *Attorney, Agent, or Firm* — Leydig, Voit & Mayer, Ltd.

(57) ABSTRACT

A vehicle braking method applied to a vehicle includes: controlling a hydraulic efficiency gear in the vehicle to provide a first target hydraulic pressure for a front axle and a rear axle, and controlling a motor apparatus in the vehicle to provide a first electric braking force for the front axle and a second electric braking force for the rear axle. A sum of a first hydraulic braking force generated by the first target hydraulic pressure on the front axle, a second hydraulic braking force generated by the first target hydraulic pressure on the rear axle, the first electric braking force, and the second electric braking force is equal to a total braking force required for braking the vehicle.

20 Claims, 6 Drawing Sheets

(58) Field of Classification Search
USPC .......................................................... 701/71–81
See application file for complete search history.

(56) References Cited

U.S. PATENT DOCUMENTS

| | | | | |
|---|---|---|---|---|
| 2004/0108771 | A1* | 6/2004 | Tsunehara ............. | B60T 13/741 303/155 |
| 2006/0273657 | A1* | 12/2006 | Wanke ................ | B60T 8/17555 303/146 |
| 2013/0297164 | A1 | 11/2013 | Lauffer et al. | |
| 2014/0319903 | A1* | 10/2014 | Murayama ............. | B60T 11/30 303/15 |
| 2019/0225199 | A1* | 7/2019 | Zhang ................... | B60T 13/586 |
| 2020/0189398 | A1* | 6/2020 | Suzuki .................. | B60T 8/1766 |
| 2020/0307386 | A1* | 10/2020 | Takahashi ................. | B60T 1/10 |
| 2020/0369158 | A1 | 11/2020 | Marx | |
| 2021/0053448 | A1 | 2/2021 | Beck et al. | |
| 2022/0314814 | A1* | 10/2022 | Fukasawa ............... | B60T 8/245 |

FOREIGN PATENT DOCUMENTS

| | | | |
|---|---|---|---|
| CN | 111251904 | B | 6/2021 |
| CN | 113525313 | A | 10/2021 |
| CN | 113602098 | A | 11/2021 |
| CN | 113635879 | A | 11/2021 |
| CN | 111775714 | B | 12/2021 |
| JP | H05161213 | A | 6/1993 |
| JP | 2005198479 | A | 7/2005 |
| JP | 2016111891 | A | 6/2016 |

* cited by examiner

VEHICLE BRAKING METHOD AND APPARATUS

CROSS-REFERENCE TO RELATED APPLICATIONS

This application is a continuation of International Application No. PCT/CN2022/104461, filed on Jul. 7, 2022, the disclosure of which is hereby incorporated by reference in its entirety.

TECHNICAL FIELD

Embodiments of this application relate to the field of automobile technologies, and in particular, to a vehicle braking method and apparatus.

BACKGROUND

Vehicle braking means forcibly decelerating or even stopping a running vehicle based on a requirement of a driver or a controller. Hydraulic braking is a form of vehicle braking.

Currently, when a vehicle implements braking through a hydraulic pressure, a braking process of the vehicle is as follows: After a driver steps a brake pedal, a total braking force required for braking the vehicle is determined, then a hydraulic pressure required for providing the total braking force through the front axle and the rear axle of the vehicle is determined based on a friction coefficient of a front axle and a friction coefficient of a rear axle of the vehicle, and the hydraulic pressure is provided for the front axle and the rear axle of the vehicle for braking.

However, in the foregoing method for implementing braking through the hydraulic pressure, because a ratio of a front-axle braking force to a rear-axle braking force of the vehicle is a fixed value, instability during braking may occur in the vehicle.

SUMMARY

The embodiments of this application provide a vehicle braking method and apparatus, to help avoid instability during braking in the vehicle.

According to a first aspect, this application provides a vehicle braking method, including: obtaining a total braking force, where the total braking force is a braking force required for braking a vehicle; controlling, based on the total braking force, a hydraulic efficiency gear in the vehicle to provide a first target hydraulic pressure for a front axle and a rear axle, and controlling a motor apparatus in the vehicle to provide a first electric braking force for the front axle and a second electric braking force for the rear axle. A sum of a first hydraulic braking force generated by the first target hydraulic pressure on the front axle, a second hydraulic braking force generated by the first target hydraulic pressure on the rear axle, the first electric braking force, and the second electric braking force is equal to the total braking force. A ratio of a first sum of the first hydraulic braking force and the first electric braking force to a second sum of the second hydraulic braking force and the second electric braking force is equal to a ratio of a first vertical load of the front axle of the vehicle to a second vertical load of the rear axle of the vehicle.

In the vehicle braking method provided in this application, after the total braking force required for braking the vehicle is obtained, in addition to using the hydraulic efficiency gear to provide braking forces for the front axle and the rear axle through providing the first target hydraulic pressure, the motor apparatus is further used to provide braking forces for the front axle and the rear axle respectively.

In other words, in this embodiment, a braking force provided for the front axle is a sum of a braking force provided by the first target hydraulic pressure for the front axle and a braking force provided by the motor apparatus for the front axle, and a braking force provided for the rear axle is a sum of a braking force provided by the first target hydraulic pressure for the rear axle and a braking force provided by the motor apparatus for the rear axle.

In addition, in this embodiment, a ratio of the braking force provided for the front axle to the braking force provided for the rear axle is the same as the ratio of the first vertical load of the front axle of the vehicle to the second vertical load of the rear axle of the vehicle. Therefore, the braking method in this embodiment helps determine a front-axle braking force and a rear-axle braking force that are located on an I curve, thereby helping avoid instability of the vehicle during braking, that is stability of the vehicle during braking is improved.

With reference to the first aspect, in a possible implementation, the first target hydraulic pressure is a smallest hydraulic pressure in a first hydraulic pressure and a second hydraulic pressure, the first hydraulic pressure is a hydraulic pressure that needs to be provided by the hydraulic efficiency gear to enable the front axle to generate a first braking force, the second hydraulic pressure is a hydraulic pressure that needs to be provided by the hydraulic efficiency gear to enable the rear axle to generate a second braking force, and the first braking force and the second braking force are braking forces that need to be respectively allocated to the front axle and the rear axle when the total braking force is allocated to the front axle and the rear axle based on the first vertical load and the second vertical load; and an electric braking force provided by the motor apparatus for a first axle in the front axle and the rear axle is zero, and the first axle is an axle corresponding to the smallest hydraulic pressure.

It may be understood that, because the smallest hydraulic pressure in the first hydraulic pressure and the second hydraulic pressure may meet a braking force requirement of an axle (also referred to as the first axle) corresponding to a smallest braking force in the first braking force and the second braking force in the front axle and the rear axle, the smallest hydraulic pressure is used as a hydraulic pressure when the hydraulic efficiency gear is used to provide a braking force, and the motor apparatus may not need to provide an additional braking force for the first axle, that is, the motor apparatus provides zero electric braking force for the first axle. In other words, in this implementation, an electric braking force may be provided for another axle (also referred to as a second axle) by using only the motor apparatus, so that a ratio of a total braking force (namely, an electric braking force and a hydraulic braking force) generated on the second axle to a braking force generated on the first axle by the smallest hydraulic pressure meets a ratio of a vertical load of the second axle to a vertical load of the first axle.

In this embodiment, because only the motor needs to provide an electric braking force for one axle, braking stability of the vehicle may be improved in a simple manner.

With reference to the first aspect, in a possible implementation, the method further includes: determining the first braking force that needs to be allocated to the front axle and the second braking force that needs to be allocated to the rear axle when the total braking force is allocated to the front axle and the rear axle based on the first vertical load and the second vertical load; determining the first hydraulic pressure that needs to be provided by the hydraulic efficiency gear to enable the front axle to generate the first braking force; determining the second hydraulic pressure that needs to be provided by the hydraulic efficiency gear to enable the rear axle to generate the second braking force; determining the smallest hydraulic pressure in the first hydraulic pressure and the second hydraulic pressure as the first target hydraulic pressure; determining a hydraulic braking force generated by a second axle in the front axle and the rear axle when the hydraulic efficiency gear provides the first target hydraulic pressure for the second axle; and determining a difference between a braking force that needs to be allocated to the second axle in the total braking force and the hydraulic braking force generated by the second axle as a target electric braking force that the motor apparatus needs to provide for the second axle.

Optionally, in this application, the controlling a hydraulic efficiency gear in the vehicle to provide a first target hydraulic pressure for a front axle and a rear axle, and controlling a motor apparatus in the vehicle to provide a first electric braking force for the front axle and a second electric braking force for the rear axle includes: if a maximum electric braking force that the motor apparatus can provide for the second axle is greater than or equal to the target electric braking force, controlling the hydraulic efficiency gear in the vehicle to provide the first target hydraulic pressure for the front axle and the rear axle, and controlling the motor apparatus in the vehicle to provide the target electric braking force for the second axle.

In this implementation, after the smallest hydraulic pressure in the first hydraulic pressure and the second hydraulic pressure is determined as the first target hydraulic pressure, a target braking force is compensated for the second axle by using the motor apparatus as a difference between the braking force that needs to be allocated to the second axle and a hydraulic braking force generated by the smallest hydraulic pressure for the second axle. Therefore, it can be ensured that the total braking force remains unchanged when the vehicle braking is performed, and it can be ensured that the vehicle can brake based on a requirement.

With reference to the first aspect, in a possible implementation, if the maximum electric braking force that the motor apparatus can provide for the second axle is less than the target electric braking force, the method further includes: determining a second target hydraulic pressure, where a third sum of a third hydraulic braking force generated by the second target hydraulic pressure on the front axle and a fourth hydraulic braking force generated by the second target hydraulic pressure on the rear axle is equal to a difference between the total braking force and the maximum electric braking force; and controlling the hydraulic efficiency gear in the vehicle to provide the second target hydraulic pressure for the front axle and the rear axle, and controlling the motor apparatus in the vehicle to provide the maximum electric braking force for the second axle.

It should be understood that, there may also be a case in which the maximum braking force that the motor apparatus can provide for the second axle is less than the braking force that the motor apparatus needs to compensate for the second axle. In this embodiment, when the maximum braking force that the motor apparatus can provide for the second axle is less than the braking force that the motor apparatus needs to compensate for the second axle, the motor apparatus is controlled to provide the maximum braking force for the second axle, and then a remaining braking force (a difference between the total braking force and the maximum braking force provided for the second axle) is compensated through hydraulic braking, to ensure that the total braking force remains unchanged, and implement braking of the vehicle.

With reference to the first aspect, in a possible implementation, the controlling, based on the total braking force, a hydraulic efficiency gear in the vehicle to provide a first target hydraulic pressure for a front axle and a rear axle, and controlling a motor apparatus in the vehicle to provide a first electric braking force for the front axle and a second electric braking force for the rear axle includes: when a preset condition is met, controlling, based on the total braking force, the hydraulic efficiency gear in the vehicle to provide the first target hydraulic pressure for the front axle and the rear axle, and controlling the motor apparatus in the vehicle to provide the first electric braking force for the front axle and the second electric braking force for the rear axle, where the preset condition includes: a change rate of a brake pedal in the vehicle is greater than a preset first threshold, an opening of the brake pedal is greater than a preset second threshold, and a slip rate of the vehicle is greater than a preset third threshold.

It should be understood that, if the change rate of the brake pedal in the vehicle is greater than the preset first threshold, or the opening of the brake pedal is greater than the preset second threshold, or the slip rate of the vehicle is greater than the preset third threshold, it may indicate that a current requirement for braking is stronger. Further, it may reflect that a degree of emergency braking is deeper, and stability of the vehicle needs to be ensured during braking. Therefore, in this embodiment, the braking method in the first aspect of this application is performed provided that the change rate of the brake pedal in the vehicle is greater than the preset first threshold, or the opening of the brake pedal is greater than the preset second threshold, or the slip rate of the vehicle is greater than the preset third threshold, to help avoid instability of the vehicle during braking.

With reference to the first aspect, in a possible implementation, the controlling, based on the total braking force, a hydraulic efficiency gear in the vehicle to provide a first target hydraulic pressure for a front axle and a rear axle, and controlling a motor apparatus in the vehicle to provide a first electric braking force for the front axle and a second electric braking force for the rear axle includes: obtaining mode setting information in the vehicle, where the mode setting information includes first mode information and/or second mode information, the first mode information indicates that a ratio of a braking force of the front axle to a braking force of the rear axle is equal to a ratio of the first vertical load to the second vertical load when the total braking force remains unchanged, and the second mode information indicates that the motor apparatus is enabled to provide a maximum electric braking force for the rear axle when the total braking force remains unchanged; and when the mode setting information is the first mode information and the vehicle does not meet a preset condition, controlling, based on the total braking force, the hydraulic efficiency gear in the vehicle to provide the first target hydraulic pressure for the front axle and the rear axle, and controlling the motor apparatus in the vehicle to provide the first electric braking force for the front axle and the second electric braking force for the rear axle, where the preset condition includes any one or more of the following conditions: a change rate of a brake pedal in the vehicle is greater than a preset first threshold, an opening of the brake pedal is greater than a preset second threshold, and a slip rate of the vehicle is greater than a preset third threshold.

In this implementation, the mode setting information in the vehicle may be used to trigger execution of the braking method according to the first aspect of this application. It may be understood that, in this implementation, a requirement of a driver may be met, so that the driver has a good sense of experience.

With reference to the first aspect, in a possible implementation, when the mode setting information is the second mode information, the method further includes: determining a maximum electric braking force that can be provided by the motor apparatus for the rear axle; determining a third target hydraulic pressure, where a fourth sum of a fifth hydraulic braking force generated by the third target hydraulic pressure on the front axle and a sixth hydraulic braking force generated by the third target hydraulic pressure on the rear axle is equal to a difference between the total braking force and the maximum electric braking force that can be provided for the rear axle; and controlling the hydraulic efficiency gear in the vehicle to provide the third target hydraulic pressure for the front axle and the rear axle, and providing the maximum electric braking force for the rear axle through the motor apparatus.

In this implementation, the motor apparatus is enabled to provide the maximum electric braking force for the rear axle, and the remaining braking force is compensated through a hydraulic pressure, so that the driver can feel more comfortable during braking.

According to a second aspect, this application provides a vehicle braking apparatus. The apparatus may include modules configured to implement the braking method in the implementations of the first aspect. Optionally, each module may be implemented by using hardware and/or software.

For example, the braking apparatus may include: an obtaining module, configured to obtain a total braking force, where the total braking force is a braking force required for braking a vehicle; and a control module, configured to control, based on the total braking force, a hydraulic efficiency gear in the vehicle to provide a first target hydraulic pressure for a front axle and a rear axle, and control a motor apparatus in the vehicle to provide a first electric braking force for the front axle and a second electric braking force for the rear axle. A sum of a first hydraulic braking force generated by the first target hydraulic pressure on the front axle, a second hydraulic braking force generated by the first target hydraulic pressure on the rear axle, the first electric braking force, and the second electric braking force is equal to the total braking force. A ratio of a first sum of the first hydraulic braking force and the first electric braking force to a second sum of the second hydraulic braking force and the second electric braking force is equal to a ratio of a first vertical load of the front axle of the vehicle to a second vertical load of the rear axle of the vehicle.

In a possible implementation, the first target hydraulic pressure is a smallest hydraulic pressure in a first hydraulic pressure and a second hydraulic pressure, the first hydraulic pressure is a hydraulic pressure that needs to be provided by the hydraulic efficiency gear to enable the front axle to generate a first braking force, the second hydraulic pressure is a hydraulic pressure that needs to be provided by the hydraulic efficiency gear to enable the rear axle to generate a second braking force, and the first braking force and the second braking force are braking forces that need to be respectively allocated to the front axle and the rear axle when the total braking force is allocated to the front axle and the rear axle based on the first vertical load and the second vertical load; and an electric braking force provided by the motor apparatus for a first axle in the front axle and the rear axle is zero, and the first axle is an axle corresponding to the smallest hydraulic pressure.

In a possible implementation, the control module is further configured to: determine a first braking force that needs to be allocated to the front axle and a second braking force that needs to be allocated to the rear axle when the total braking force is allocated to the front axle and the rear axle based on the first vertical load and the second vertical load; determine a first hydraulic pressure that needs to be provided by the hydraulic efficiency gear to enable the front axle to generate the first braking force; determine a second hydraulic pressure that needs to be provided by the hydraulic efficiency gear to enable the rear axle to generate the second braking force; determine the smallest hydraulic pressure in the first hydraulic pressure and the second hydraulic pressure as the first target hydraulic pressure; determine a hydraulic braking force generated by a second axle in the front axle and the rear axle when the hydraulic efficiency gear provides the first target hydraulic pressure for the second axle; and determine a difference between a braking force that needs to be allocated to the second axle in the total braking force and the hydraulic braking force generated by the second axle as a target electric braking force that the motor apparatus needs to provide for the second axle.

In a possible implementation, the control module is further configured to: if a maximum electric braking force that the motor apparatus can provide for the second axle is greater than or equal to the target electric braking force, control the hydraulic efficiency gear in the vehicle to provide the first target hydraulic pressure for the front axle and the rear axle; and control the motor apparatus in the vehicle to provide the target electric braking force for the second axle.

In a possible implementation, if the maximum electric braking force that the motor apparatus can provide for the second axle is less than the target electric braking force, the control module is further configured to: determine a second target hydraulic pressure, where a third sum of a third hydraulic braking force generated by the second target hydraulic pressure on the front axle and a fourth hydraulic braking force generated by the second target hydraulic pressure on the rear axle is equal to a difference between the total braking force and the maximum electric braking force; and control the hydraulic efficiency gear in the vehicle to provide the second target hydraulic pressure for the front axle and the rear axle, and control the motor apparatus in the vehicle to provide the maximum electric braking force for the second axle.

In a possible implementation, the control module is further configured to: when a preset condition is met, control, based on the total braking force, the hydraulic efficiency gear in the vehicle to provide the first target hydraulic pressure for the front axle and the rear axle, and control the motor apparatus in the vehicle to provide the first electric braking force for the front axle and the second electric braking force for the rear axle, where the preset condition includes: a change rate of a brake pedal in the vehicle is greater than a preset first threshold, an opening of the brake pedal is greater than a preset second threshold, and a slip rate of the vehicle is greater than a preset third threshold.

In a possible implementation, the control module is further configured to: obtain mode setting information in the vehicle, where the mode setting information includes first mode information and/or second mode information, the first mode information indicates that a ratio of a braking force of the front axle to a braking force of the rear axle is equal to a ratio of the first vertical load to the second vertical load when the total braking force remains unchanged, and the second mode information indicates that the motor apparatus is enabled to provide a maximum electric braking force for the rear axle when the total braking force remains unchanged; and when the mode setting information is the first mode information and the vehicle does not meet a preset condition, control, based on the total braking force, the hydraulic efficiency gear in the vehicle to provide the first target hydraulic pressure for the front axle and the rear axle, and control the motor apparatus in the vehicle to provide the first electric braking force for the front axle and the second electric braking force for the rear axle, where the preset condition includes any one or more of the following conditions: a change rate of a brake pedal in the vehicle is greater than a preset first threshold, an opening of the brake pedal is greater than a preset second threshold, and a slip rate of the vehicle is greater than a preset third threshold.

In a possible implementation, when the mode setting information is the second mode information, the control module is further configured to: determine a maximum electric braking force that can be provided by the motor apparatus for the rear axle; determine a third target hydraulic pressure, where a fourth sum of a fifth hydraulic braking force generated by the third target hydraulic pressure on the front axle and a sixth hydraulic braking force generated by the third target hydraulic pressure on the rear axle is equal to a difference between the total braking force and the maximum electric braking force that can be provided for the rear axle; and control the hydraulic efficiency gear in the vehicle to provide the third target hydraulic pressure for the front axle and the rear axle, and provide the maximum electric braking force for the rear axle through the motor apparatus.

According to a third aspect, this application provides a vehicle braking apparatus, including a memory and a processor. The memory is configured to store program instructions, and the processor is configured to invoke the program instructions in the memory to perform the method according to any one of the first aspect or the possible implementations of the first aspect.

According to a fourth aspect, this application provides a vehicle, including the apparatus according to any one of the second aspect or the possible implementations of the second aspect.

According to a fifth aspect, this application provides a computer-readable medium. The computer-readable medium stores program code used to be executed by a computer, and the program code includes instructions used to perform the method according to any one of the first aspect or the possible implementations of the first aspect.

According to a sixth aspect, this application provides a computer program product. The computer program product includes computer program code. When the computer program code is run on a computer, the computer is enabled to implement the method according to any one of the first aspect or the possible implementations of the first aspect.

In this application, for technical effects of any one of the second aspect to the sixth aspect, refer to the first aspect. Details are not described herein again.

DESCRIPTION OF EMBODIMENTS

A green car, as a rapidly growing type of vehicle today, its braking is directly related to traffic safety. Vehicle braking means forcibly decelerating or even stopping a running vehicle based on a requirement of a driver or a controller.

Figure 1:
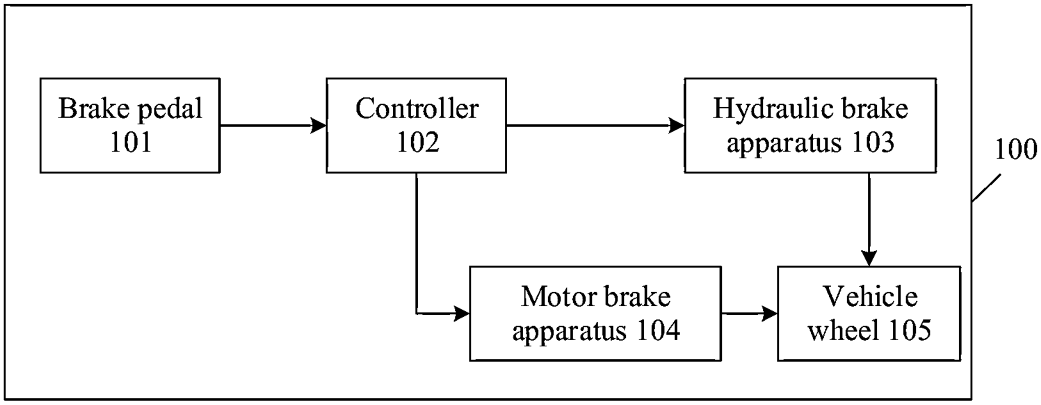
FIG. 1 is a schematic diagram of a structure of a braking system in an automobile according to this application.

FIG. 1 is a schematic diagram of a structure of a braking system in an automobile according to this application. As shown in FIG. 1, a braking system 100 includes a brake pedal 101, a controller 102, a hydraulic brake apparatus 103, a motor brake apparatus 104, and a vehicle wheel 105.

For the braking system 100 shown in FIG. 1, when a driver steps the brake pedal 101, the braking mainly includes two paths: hydraulic braking and motor braking. Specifically, for the hydraulic braking, when the driver steps the brake pedal 101, the controller 102 transfers a braking force generated by the driver stepping the brake pedal 101 to the hydraulic brake apparatus 103, and then a brake master cylinder, a hydraulic pipe, a brake caliper, and the like in the hydraulic brake apparatus 102 apply the braking force to the vehicle wheel 105 based on controlling a hydraulic pressure, to implement braking of a vehicle. For the motor braking, when the driver steps the brake pedal 101, the controller 102 controls a drive motor in the motor brake apparatus 104 to generate a reverse torque, and the reverse torque is directly acted on the vehicle wheel 105 by using a transmission component, to implement braking.

It should be noted that, regardless of the hydraulic braking or the motor braking, a ratio of a braking force that is allocated to a front axle of a vehicle to a braking force that is allocated to a rear axle of the vehicle needs to be determined when reverse torque is acted on a vehicle wheel to implement braking, which is also referred to as a proportion of braking force allocation of the front axle and the rear axle in this application.

Figure 2:
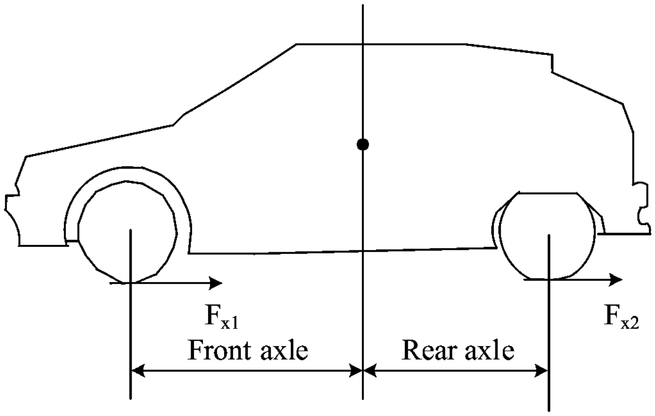
FIG. 2 is a schematic diagram of a front-axle braking force and a rear-axle braking force when a vehicle brakes according to this application.

More specifically, for the braking system 100 shown in FIG. 1, when the vehicle implements braking through a hydraulic pressure, as shown in FIG. 2, a braking process of the vehicle is as follows: When the driver steps the brake pedal, a total braking force required for braking the vehicle is determined, then a hydraulic pressure required for providing the total braking force through the front axle and the rear axle of the vehicle is determined based on a friction coefficient of the front axle and a friction coefficient of the rear axle of the vehicle, and the hydraulic pressure is provided for the front axle and the rear axle of the vehicle, to separately generate a braking force $F_{x1}$ of the front axle and a braking force $F_{x2}$ of the rear axle, to implement braking of the vehicle.

In addition, when a current vehicle implements braking by using the hydraulic pressure, because the friction coefficient of the front axle and the friction coefficient of the rear axle are fixed, when the vehicle actually performs braking, a ratio of a braking force of the front axle to a braking force of the rear axle that are generated is usually a fixed value. In other words, when the vehicle implements braking by using the hydraulic pressure, the ratio of the braking force of the front axle to the braking force of the rear axle that are actually generated is a fixed value.

Actually, when the vehicle brakes by using a hydraulic pressure braking manner, allocation of the braking force of the front axle and the braking force of the rear axle should meet a curve I. Each point on the curve I represents a braking force that needs to be allocated to the front axle and a braking force that needs to be allocated to the rear axle under the corresponding total braking force. That is, allocation of the braking force that is of the front axle and the braking force that is of the rear axle and that are corresponding to any point on the curve I is optimal. For a related concept of the curve I, refer to detailed descriptions in a conventional technology. Details are not described herein again.

Figure 3:
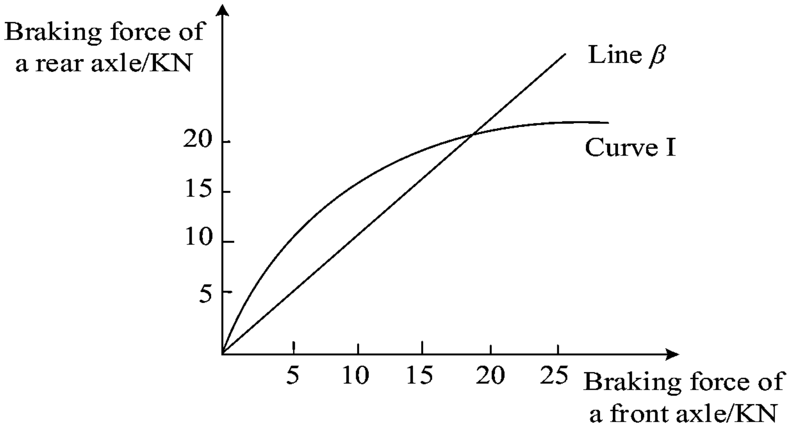
FIG. 3 is a schematic diagram of allocation of braking forces of a front axle and a rear axle according to an embodiment of this application.

For example, FIG. 3 is a schematic diagram of allocation of braking forces of a front axle and a rear axle according to an embodiment of this application. As shown in FIG. 3, a horizontal coordinate represents a braking force of the front axle (unit value: kN), and a vertical coordinate represents a braking force of the rear axle (unit value: kN). Ideal optimal allocation of the braking force of the front axle and the braking force of the rear axle during braking of the vehicle should meet a curve I, and the braking force of the front axle actually generated and the braking force of the rear axle actually generated during braking of the vehicle should meet a line β. It can be learned from comparison that, after a friction coefficient of the front axle and a friction coefficient of the rear axle of the vehicle are fixed, except that allocation of the braking force of the front axle and the braking force of the rear axle of the vehicle in a specific working condition meets the curve I (that is, allocation of a braking force of the front axle and a braking force of the rear axle at an intersection point of the curve I and the line β in FIG. 3), allocation of the braking force of the front axle and the braking force of the rear axle is not ideal in most other working conditions, and there is a specific difference from the curve I. Therefore, in an allocation condition of the braking force of the front axle actually generated and the braking force of the rear axle actually generated corresponding to the line β, a case in which a rear wheel first locks and slides and then a front wheel locks and slides may occur in the vehicle, that is, vehicle instability during braking occurs.

In addition, the allocation of the braking force of the front axle and the braking force of the rear axle not only affects stability of the vehicle, but also affects a comfort and energy recovery efficiency of the vehicle during braking.

Figure 4:
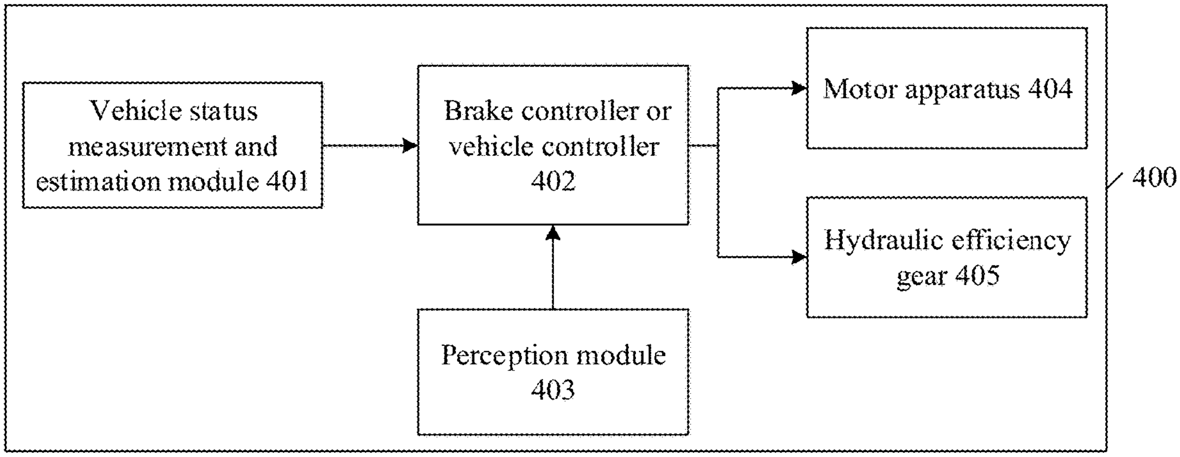
FIG. 4 is a schematic diagram of a braking system when a vehicle brakes according to this application.

In view of this, an embodiment of this application provides a vehicle braking method, to allocate a braking force of the front axle and a braking force of the rear axle of the vehicle in a hybrid manner of hydraulic braking and motor braking. Therefore, the stability of the vehicle during braking can be implemented, and further, the comfort of the vehicle during braking and the energy recovery efficiency during braking can be improved. The method can be run in a brake controller or a vehicle controller. For example, FIG. 4 is a schematic diagram of a braking system when a vehicle brakes according to this application. As shown in FIG. 4, the system 400 includes a vehicle status measurement and estimation module 401, a brake controller or vehicle controller 402, a perception module 403, a motor apparatus 404, and a hydraulic efficiency gear 405.

The vehicle status measurement and estimation module 401 is configured to measure and estimate a vehicle status, for example, a vehicle status like a longitudinal acceleration of the vehicle, a road surface slope, and a wheel speed, required for implementing a function of allocating a braking force of a front axle and a braking force of a rear axle.

The brake controller or vehicle controller 402 is configured to: determine a total braking force when the vehicle brakes, perform the vehicle braking method provided in this application, and allocate the braking force of the front axle and the braking force of the rear axle by controlling the motor apparatus 404 and the hydraulic efficiency gear 405.

The perception module 403 is configured to sense a driving intention of a driver or autonomous driving. The driving intention in this application is mainly an intention that the driver or an autonomous driving vehicle needs to perform vehicle braking.

The motor apparatus 404 executes a braking force of the front axle and/or a braking force of the rear axle that needs to be allocated by a motor based on a calculation from the brake controller or vehicle controller 402. It should be noted herein that a specific form of the motor apparatus 404 is not limited in this embodiment of this application. For example, the apparatus may be a single-motor mechanism, a two-motor mechanism, a three-motor mechanism, or a four-motor mechanism.

The hydraulic efficiency gear 405 executes a braking force of the front axle and/or a braking force of the rear axle that needs to be allocated by the hydraulic efficiency gear 405 based on a calculation from the brake controller or vehicle controller 402.

It should be noted herein that this embodiment of this application may be applied to an artificial intelligence driving scenario, or may be extended to an autonomous driving scenario or a manual driving scenario.

Figure 5:
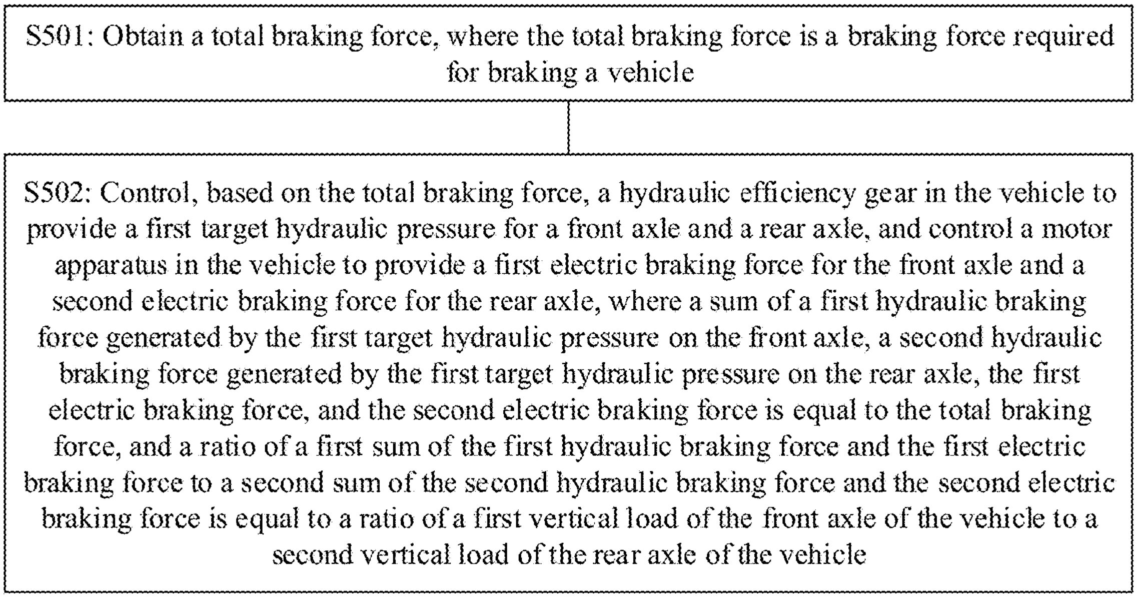
FIG. 5 is a schematic flowchart of a vehicle braking method according to an embodiment of this application.

FIG. 5 is a vehicle braking method according to an embodiment of this application. As shown in FIG. 5, the method includes S501 and S502. The method in this application may be performed by the braking system shown in FIG. 4.

S501: Obtain a total braking force, where the total braking force is a braking force required for braking a vehicle.

The braking means forcibly decelerating or even stopping a running vehicle based on a requirement of a driver or a controller. In this embodiment, the total braking force is a value of the braking force required for the vehicle to implement braking. For example, a value of the total braking force of the vehicle from a running state to a stopped state is implemented.

It should be noted herein that a manner of obtaining the total braking force is not limited in embodiments of this application.

In an implementation solution, when the vehicle is manually driven, the total braking force may be determined based on a status of a brake pedal on which the driver steps. For example, the total braking force is determined based on an opening of the brake pedal. It should be understood that when the opening of the brake pedal is different, the total braking force required for implementing braking by the vehicle is also different.

In another implementation solution, when the vehicle is autonomous driving, a currently required total braking force may be determined by using some road condition information and the like collected by the autonomous driving vehicle. For example, if it is determined, based on the collected information, that there is a red light at a front crossroad and a current vehicle speed is too high, the vehicle automatically determines a value of the currently required total braking force.

S502: Control, based on the total braking force, a hydraulic efficiency gear in the vehicle to provide a first target hydraulic pressure for a front axle and a rear axle, and control a motor apparatus in the vehicle to provide a first electric braking force for the front axle and a second electric braking force for the rear axle, where a sum of a first hydraulic braking force generated by the first target hydraulic pressure on the front axle, a second hydraulic braking force generated by the first target hydraulic pressure on the rear axle, the first electric braking force, and the second electric braking force is equal to the total braking force, and a ratio of a first sum of the first hydraulic braking force and the first electric braking force to a second sum of the second hydraulic braking force and the second electric braking force is equal to a ratio of a first vertical load of the front axle of the vehicle to a second vertical load of the rear axle of the vehicle.

A vertical load of the front axle may be considered as an acting force of the vehicle vertically acting on the front axle, and a vertical load of the rear axle may be considered as an acting force of the vehicle vertically acting on the rear axle.

It should be noted that the vertical load (also referred to as the first vertical load in this application) of the front axle and the vertical load (also referred to as the second vertical load in this application) of the rear axle are an important factor that affects allocation of a braking force of the front axle and a braking force of the rear axle, and the vertical load is affected by a braking acceleration of the vehicle during braking. For example, during emergency braking, the vehicle may cause serious axle weight transfer due to inertia, that is, the vertical load of the front axle increases, and the vertical load of the rear axle decreases. Therefore, the axle weight transfer caused during braking also affects allocation of braking forces of the front axle and the rear axle by using the vertical load.

Generally, when the vertical load of the front axle and the vertical load of the rear axle are determined, and the total braking force is determined, a braking force that needs to be allocated to the front axle and a braking force that needs to be allocated to the rear axle may be determined. Specifically, a ratio of the braking force of the front axle to the braking force of the rear axle is a ratio of the vertical load of the front axle to the vertical load of the rear axle. In this application, the braking force that needs to be allocated to the front axle is also referred to as a first braking force, and the braking force that needs to be allocated to the rear axle is also referred to as a second braking force.

It is noted herein that the braking force that needs to be allocated to the front axle and the braking force that needs to be allocated to the rear axle are a braking force of the front axle and a braking force of the rear axle that are on a curve I. In other words, when providing the braking force for the front axle and providing the braking force for the rear axle in this application, if the braking force provided for the front axle is the first braking force and the braking force provided for the rear axle is the second braking force, the braking force of the front axle and the braking force of the rear axle are on the curve I, so that stability of the vehicle during braking can be ensured.

However, it should be understood that, when hydraulic braking is used, a hydraulic pressure provided by a hydraulic braking apparatus for the front axle is the same as a hydraulic pressure provided for the rear axle. This is because a friction coefficient of the front axle is inconsistent with a friction coefficient of the rear axle. As a result, when the hydraulic braking apparatus provides a same hydraulic pressure for the front axle and the rear axle, the braking force generated by the front axle is different from the braking force generated by the rear axle. Therefore, it may be understood that, in most working conditions, if only the braking force of the front axle and the braking force of the rear axle provided by the hydraulic brake are used, the ratio of the braking force of the front axle to the braking force of the rear axle is not the ratio of the vertical load of the front axle to the vertical load of the rear axle. In view of this, in this embodiment, the vehicle is braked in a hydraulic braking manner and a motor braking manner together, so that a sum (also referred to as a first sum) of a braking force generated by the hydraulic pressure acting on the front axle and a braking force provided by the motor apparatus for the front axle is the first braking force, and a sum (also referred to as a second sum) of a braking force generated by the hydraulic pressure acting on the rear axle and a braking force provided by the motor apparatus for the rear axle is the second braking force. To be specific, the vehicle is braked by using both the hydraulic braking manner and the motor braking manner, so that the ratio of the braking force of the front axle to the braking force of the rear axle is equal to the ratio of the vertical load of the front axle to the vertical load of the rear axle, and the braking force of the front axle and the braking force of the rear axle are on the curve I, to ensure stability of the vehicle during braking.

In an example, in this embodiment, after a hydraulic pressure (also referred to as the first target hydraulic pressure) is determined, a braking force (also referred to as the first hydraulic braking force) generated by the first target hydraulic pressure on the front axle and a braking force (also referred to as the second hydraulic braking force) generated on the rear axle may be first calculated, and then a difference between the first braking force and the first hydraulic braking force is calculated (for example, the obtained difference is referred to as a front axle electric braking force compensation value), to obtain the electric braking force (also referred to as the first electric braking force) that the motor apparatus needs to provide for the front axle, and a difference between the second braking force and the second hydraulic braking force (for example, the obtained difference is referred to as a rear axle electric braking force compensation value), to obtain the electric braking force (also referred to as the second electric braking force) that the motor apparatus needs to provide for the rear axle, and finally, when braking, the first target hydraulic pressure is provided for the front axle and the rear axle, and the first electric braking force is provided for the front axle through the motor apparatus and the second electric braking force is provided for the rear axle through the motor apparatus.

In the vehicle braking method provided in this application, after the total braking force required for braking the vehicle is obtained, in addition to using the hydraulic efficiency gear to provide braking forces for the front axle and the rear axle through providing the first target hydraulic pressure, the motor apparatus is further used to provide braking forces for the front axle and the rear axle respectively. In other words, in this embodiment, a braking force provided for the front axle is a sum of a braking force provided by the first target hydraulic pressure for the front axle and a braking force provided by the motor apparatus for the front axle, and a braking force provided for the rear axle is a sum of a braking force provided by the first target hydraulic pressure for the rear axle and a braking force provided by the motor apparatus for the rear axle. In addition, in this embodiment, a ratio of the braking force provided for the front axle to the braking force provided for the rear axle is the same as the ratio of the first vertical load of the front axle of the vehicle to the second vertical load of the rear axle of the vehicle. Therefore, the braking force of the front axle and the braking force of the rear axle that are determined based on the braking method in this embodiment are located on the curve I, and this helps avoid instability of the vehicle during braking.

In an implementation solution, the first target hydraulic pressure in this application is the smallest hydraulic pressure in the first hydraulic pressure and the second hydraulic pressure. The first hydraulic pressure is a hydraulic pressure that needs to be provided by the hydraulic efficiency gear when the front axle generates the first braking force, and the second hydraulic pressure is a hydraulic pressure that needs to be provided by the hydraulic efficiency gear when the rear axle generates the second braking force. The first braking force and the second braking force are braking forces that need to be respectively allocated to the front axle and the rear axle when the total braking force is allocated to the front axle and the rear axle based on the first vertical load and the second vertical load. In this solution, an electric braking force provided by the motor apparatus for a first axle in the front axle and the rear axle is zero, and the first axle is an axle corresponding to the smallest hydraulic pressure.

Figure 6:
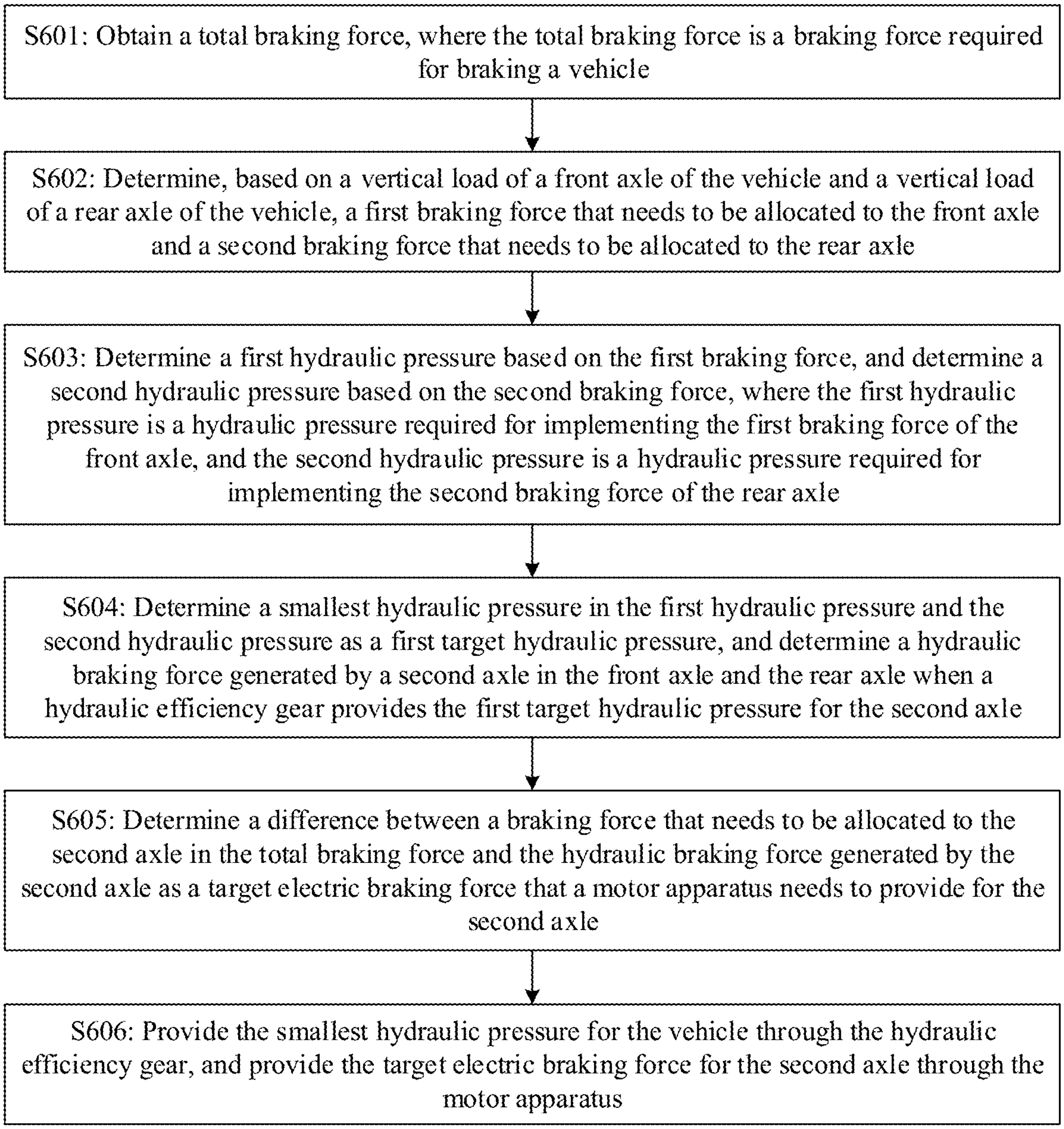
FIG. 6 is a schematic flowchart of a vehicle braking method according to another embodiment of this application.

For ease of understanding, the braking method in this implementation solution is described in detail with reference to FIG. 6. The method includes the following steps.

S601: Obtain a total braking force, where the total braking force is a braking force required for braking a vehicle.

For a detailed description of this step, refer to the description in S501 in the embodiment in FIG. 5. Details are not described herein again.

S602: Determine, based on a vertical load of a front axle of the vehicle and a vertical load of a rear axle of the vehicle, a first braking force that needs to be allocated to the front axle and a second braking force that needs to be allocated to the rear axle.

During specific implementation, if the total braking force is represented as $f_b$, the vertical load of the front axle during braking is represented as $f_{z1}$, the vertical load of the rear axle during braking is represented as $f_{z2}$, a braking force (namely, the first braking force) that needs to be allocated to the front axle is represented as $f_{b1}$, and a braking force (namely, the second braking force) that needs to be allocated to the rear axle is represented as $f_{b2}$, then $$f_{b1} = \left(\frac{f_{z1}}{f_{z1} + f_{z2}}\right) * f_b, \text{ and } f_{b2} = \left(\frac{f_{z2}}{f_{z1} + f_{z2}}\right) * f_b.$$

It should be noted herein that the first braking force and the second braking force calculated in this manner correspond to a point on a curve I. To be specific, the braking force to be allocated to the front axle and the braking force to be allocated to the rear axle that are calculated by using the vertical load of the front axle and the vertical load of the rear axle respectively are optimal allocation.

S603: Determine a first hydraulic pressure based on the first braking force, and determine a second hydraulic pressure based on the second braking force, where the first hydraulic pressure is a hydraulic pressure required for implementing the first braking force of the front axle, and the second hydraulic pressure is a hydraulic pressure required for implementing the second braking force of the rear axle.

It should be understood that, when hydraulic braking is used, the braking force allocated to the front axle or the braking force allocated to the rear axle is implemented by controlling a hydraulic pressure. In other words, when the hydraulic pressure is different, the braking force allocated to the front axle is different from the braking force allocated to the rear axle.

Therefore, in this embodiment, after the first braking force to be allocated to the front axle and the second braking force to be allocated to the rear axle are separately determined, the hydraulic pressure (also referred to as the first hydraulic pressure) required for implementing the first braking force of the front axle and the hydraulic pressure (also referred to as the second hydraulic pressure) required for implementing the second braking force of the rear axle are further determined.

During specific implementation, if the first hydraulic pressure is represented as $p_1$, and the second hydraulic pressure is represented as $p_2$, $$p_1 = \frac{f_{b1}}{c_1}, \text{ and } p_2 = \frac{f_{b2}}{c_2}.$$

Herein, $c_1$ represents a friction coefficient of the front axle, and $c_2$ is a friction coefficient of the rear axle. For concepts of the friction coefficient of the front axle and the friction coefficient of the rear axle, refer to descriptions in a conventional technology. Details are not described herein again.

S604: Determine a smallest hydraulic pressure in the first hydraulic pressure and the second hydraulic pressure as a first target hydraulic pressure, and determine a hydraulic braking force generated by a second axle in the front axle and the rear axle when a hydraulic efficiency gear provides the first target hydraulic pressure for the second axle.

It should be noted that, when hydraulic braking is used, a hydraulic pressure provided by a hydraulic braking apparatus for the front axle is the same as a hydraulic pressure provided for the rear axle. However, because a friction coefficient of the front axle is inconsistent with a friction coefficient of the rear axle. As a result, when the hydraulic braking apparatus provides a same hydraulic pressure for the front axle and the rear axle, the braking force generated by the front axle is different from the braking force generated by the rear axle.

Specifically, when the hydraulic braking is used, if a hydraulic pressure provided by the hydraulic braking apparatus is recorded as P, the braking force generated by the front axle is a product of P and the friction coefficient $c_1$ of the front axle, and the braking force generated by the rear axle is a product of P and the friction coefficient $c_2$ of the rear axle.

S605: Determine a difference between a braking force that needs to be allocated to the second axle in the total braking force and the hydraulic braking force generated by the second axle as a target electric braking force that a motor apparatus needs to provide for the second axle.

It may be understood that, when the smallest hydraulic pressure is used as the hydraulic pressure provided when the hydraulic braking is used, a braking force of an axle corresponding to the smallest hydraulic pressure may be met. For example, if the first hydraulic pressure is smaller than the second hydraulic pressure, the first braking force of the front axle may be satisfied when the first hydraulic pressure is used as the hydraulic pressure provided when the hydraulic braking is used. If the second hydraulic pressure is smaller than the first hydraulic pressure, the second braking force of the rear axle may be satisfied when the second hydraulic pressure is used as the hydraulic pressure provided when the hydraulic braking is used.

It may be further understood that, when the smallest hydraulic pressure in the first hydraulic pressure and the second hydraulic pressure is used as the hydraulic pressure provided when the hydraulic braking is used, for an axle (also referred to as the second axle in this application) corresponding to a biggest hydraulic pressure in the first hydraulic pressure and the second hydraulic pressure, a braking force provided by the smallest hydraulic pressure for the second axle is less than a braking force that needs to be allocated to the second axle when the total braking force is allocated based on the vertical load, that is, the braking force provided by the smallest hydraulic pressure is not enough. In other words, there is a difference between the braking force provided by the smallest hydraulic pressure for the second axle and an ideal braking force of the second axle. In this case, in this embodiment, a first compensation electric braking force (also referred to as a target electric braking force) is determined based on the biggest hydraulic pressure in the first hydraulic pressure and the second hydraulic pressure, where the target electric braking force is used to make the braking force of the second axle equal to a braking force that needs to be allocated to the second axle when the total braking force is allocated based on a vertical load when the target electric braking force is used to provide a target axle with the smallest hydraulic pressure.

In an example, the target electric braking force is a braking force difference between a braking force provided by the smallest hydraulic pressure for the second axle and a braking force that needs to be allocated to the second axle when the total braking force is allocated based on the vertical load. If the smallest hydraulic pressure in the first hydraulic pressure and the second hydraulic pressure is represented as $p_{min}$, and the target electric braking force is represented as $f_{compensation}$, $$f_{compensation} = f_b - (c_1 + c_2)p_{min}$$

S606: Provide the smallest hydraulic pressure for the vehicle through the hydraulic efficiency gear, and provide the target electric braking force for the second axle through the motor apparatus.

In this embodiment, after the smallest hydraulic pressure and the target electric braking force are determined, and it is determined that a maximum electric braking force that the motor apparatus can provide for the second axle is greater than or equal to the target electric braking force, the hydraulic efficiency gear is used to provide the smallest hydraulic pressure for the vehicle, and the motor apparatus is used to provide the target electric braking force for the second axle, to provide the total braking force for the vehicle to implement braking of the vehicle.

According to the vehicle braking method provided in this application, after the total braking force required for implementing vehicle braking is obtained, an optimal braking force of the front axle and an optimal braking force of the rear axle are first separately determined based on the vertical load of the front axle and the vertical load of the rear axle, and then a sum of an optimal hydraulic pressure of the front axle and an optimal hydraulic pressure of the rear axle is determined based on the optimal braking force of the front axle and the optimal braking force of the rear axle. Then, a smallest hydraulic pressure in the optimal hydraulic pressure of the front axle and the optimal hydraulic pressure of the rear axle is used as the hydraulic pressure when the braking force is provided for the vehicle by using the hydraulic efficiency gear. It may be understood that when the braking force is provided for the vehicle by using the smallest hydraulic pressure, it may be ensured that the braking force of the axle corresponding to the smallest hydraulic pressure is optimal, and for the braking force of the second axle corresponding to the biggest hydraulic pressure, the braking force provided by the smallest hydraulic pressure for the second axle cannot reach an optimal braking force of the second axle. In this embodiment of this application, to enable the braking force of the second axle to reach the optimal braking force of the target axle, the target electric braking force is further provided for the target axle through the motor apparatus. The target electric braking force is a braking force difference between the braking force provided by the smallest hydraulic pressure for the second axle and the braking force that needs to be allocated to the second axle when the total braking force is allocated based on the vertical load. Therefore, the technical solutions provided in this application help improve stability of the vehicle during braking.

It may be understood that, there may also be a case in which a maximum electric braking force provided by the motor apparatus for the second axle is less than the target electric braking force. For example, the maximum electric braking force that can be provided by the motor apparatus for the second axle and that is defined in a current vehicle status regulation is less than the target electric braking force determined in this application, or an upper limit of the electric braking force that can be provided by the motor apparatus for the second axle is less than the target electric braking force determined in this application. In this embodiment of this application, when the maximum electric braking force that can be provided by the motor apparatus for the second axle is less than the target electric braking force, the method in this application further includes: determining a second target hydraulic pressure, where a third sum of a third hydraulic braking force generated by the second target hydraulic pressure on the front axle and a fourth hydraulic braking force generated by the second target hydraulic pressure on the rear axle is equal to a difference between the total braking force and the maximum electric braking force; and controlling the hydraulic efficiency gear in the vehicle to provide the second target hydraulic pressure for the front axle and the rear axle, and controlling the motor apparatus in the vehicle to provide the maximum electric braking force for the second axle.

During specific implementation, if the maximum electric braking force that the motor apparatus can provide for the second axle is less than the target electric braking force due to a capability limitation of the motor apparatus or a battery capability limitation, the maximum electric braking force that the motor apparatus provides for the second axle is used, and a remaining braking force is compensated by using a hydraulic pressure (also referred to as the second target hydraulic pressure in this application).

For example, in an implementation solution, the second target hydraulic pressure is a quotient of a first braking force difference and a target friction coefficient, where the first braking force difference is a difference between the total braking force and the maximum electric braking force that can be provided by the motor apparatus for the second axle, and the target friction coefficient is a sum of the friction coefficient of a front wheel and the friction coefficient of a rear wheel. For example, if the maximum electric braking force provided by the motor apparatus for the second axle is represented as $f_{electric\text{-}max}$, and the second target hydraulic pressure is represented as $p_{compensation}$, the first braking force difference may be represented as $f_b - f_{electric\text{-}max}$. Further:

$$p_{compensation} = \frac{f_b - f_{electric\text{-}max}}{c_1 + c_2}$$

Alternatively, $p_{compensation}$ may be calculated by using the following formula:

$$\Delta f = f_{compensation} - f_{electric\text{-}max}$$

$$p_{compensation} = p_{min} + \frac{\Delta f}{c_1 + c_2}$$

For concepts of $f_{compensation}$, $c_1$, and $c_2$, refer to the descriptions in the foregoing embodiment. Details are not described herein again.

In this embodiment, when the maximum electric braking force that the motor apparatus can provide for the second axle is less than the target electric braking force, in addition to the maximum electric braking force that the motor apparatus provides for the second axle, remaining insufficient braking forces are all compensated by using hydraulic pressures, so that an actual braking force of the vehicle is consistent with the total braking force, so that the vehicle implements braking.

In an optional embodiment, in this application, the controlling, based on the total braking force, a hydraulic efficiency gear in the vehicle to provide a first target hydraulic pressure for the front axle and the rear axle, and controlling a motor apparatus in the vehicle to provide a first electric braking force for the front axle and a second electric braking force for the rear axle may be performed only when a preset condition is met. For example, the preset condition includes: a change rate of a brake pedal in the vehicle is greater than a preset first threshold, an opening of the brake pedal is greater than a preset second threshold, and a slip rate of the vehicle is greater than a preset third threshold. In other words, the process of S502 in this application is performed only when the change rate of the brake pedal in the vehicle is greater than the preset first threshold, or the opening of the brake pedal is greater than the preset second threshold, or the slip rate of the vehicle is greater than the preset third threshold.

It should be noted herein that specific values of the first threshold, the second threshold, and the third threshold are not limited in this embodiment, and may be determined based on different requirements.

In an optional embodiment, in this application, mode setting information in the vehicle may alternatively be obtained first. The mode setting information includes first mode information and/or second mode information, the first mode information indicates that a ratio of a braking force of the front axle to a braking force of the rear axle is equal to a ratio of the first vertical load to the second vertical load when the total braking force remains unchanged, and the second mode information indicates that the motor apparatus is enabled to provide a maximum electric braking force for the rear axle when the total braking force remains unchanged. When the mode setting information is the first mode information and the vehicle does not meet the preset condition, the process of S502 in this application is performed. The preset condition includes any one or more of the following conditions: The change rate of the brake pedal in the vehicle is greater than the preset first threshold, the opening of the brake pedal is greater than the preset second threshold, and the slip rate of the vehicle is greater than the preset third threshold.

It may be understood that, when the total braking force remains unchanged, the ratio of the braking force of the front axle to the braking force of the rear axle is equal to the ratio of the first vertical load to the second vertical load, so that stability of the vehicle during braking can be ensured. Therefore, in this application, the first mode information is also referred to as a stable mode.

It may be understood that, when the motor apparatus provides the maximum electric braking force for the rear axle when the total braking force remains unchanged, comfort of the driver may be improved. Therefore, in this embodiment, the second mode information is also referred to as a comfort mode.

Optionally, in this embodiment, an ECO mode may be further included. The ECO mode means that the electric braking force provided by the motor apparatus for the front axle and the electric braking force provided by the rear axle are as large as possible, to improve energy recovery efficiency while ensuring that the total braking force remains unchanged.

Figure 7:
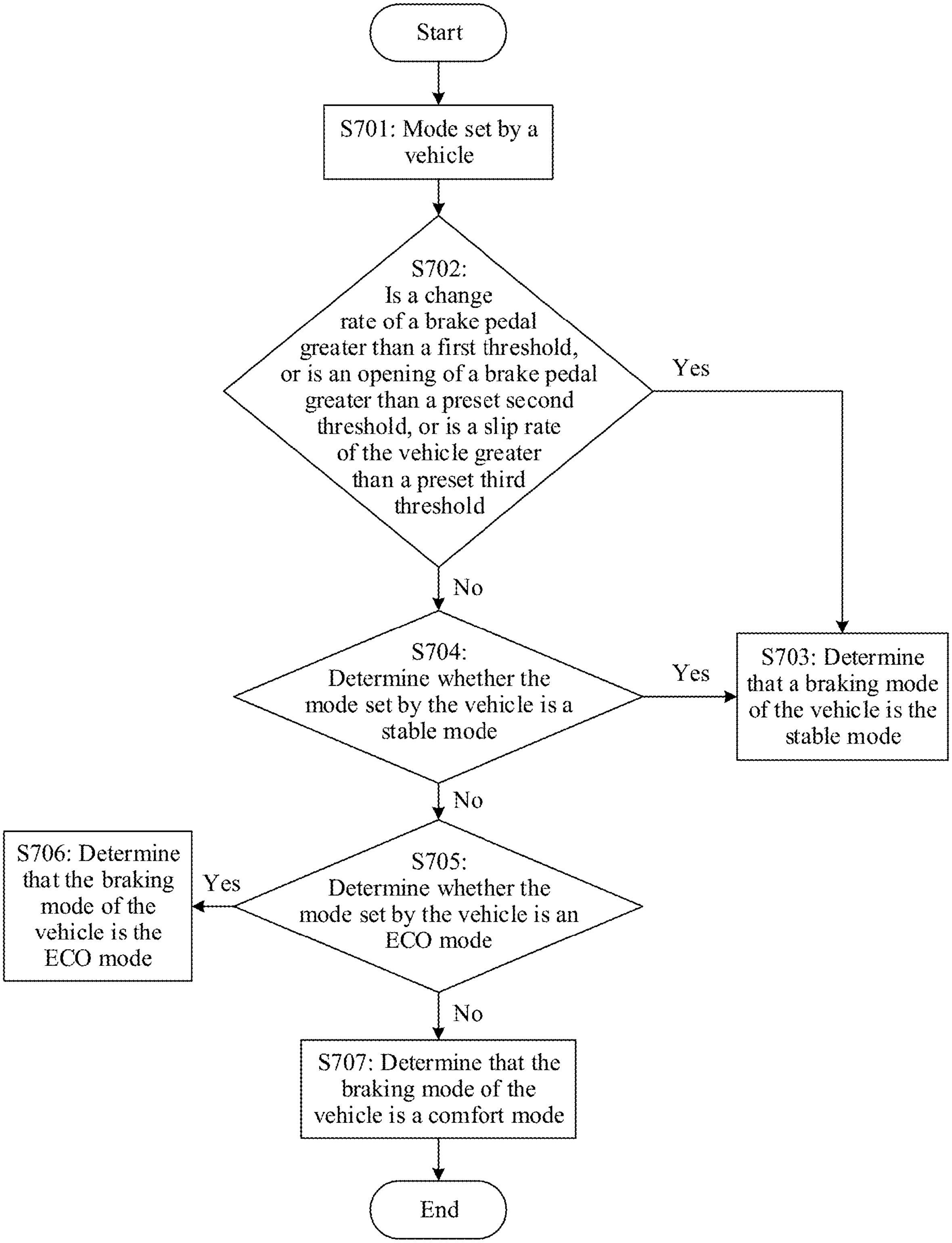
FIG. 7 is a schematic flowchart of a mode selection process according to an embodiment of this application.

In other words, in this application, a plurality of modes may be selected. For example, FIG. 7 is a schematic flowchart of mode selection according to an embodiment of this application. As shown in FIG. 7, the mode selection procedure includes the following steps.

S701: Obtain a mode set by a vehicle.

For example, the vehicle provides a human-computer interaction manner for the driver to set an expected mode; or the vehicle may automatically identify a driving style of the driver, and automatically sets the mode expected by the driver.

S702: Monitor whether a change rate of a brake pedal is greater than a first threshold, or an opening of a brake pedal is greater than a preset second threshold, or a slip rate of the vehicle is greater than a preset third threshold; and if yes, S703 is performed; or if no, S704 is performed.

S703: Determine that a braking mode of the vehicle is a stable mode.

In other words, when the monitored change rate of the pedal is greater than the first threshold, or the opening of the brake pedal is greater than the second threshold, or the slip rate of the vehicle is greater than the third threshold, it is determined that the braking mode of the vehicle is the stable mode.

S704: Determine whether the mode set by the vehicle is the stable mode, and if yes, S703 is performed, or if no, S705 is performed.

In other words, when the monitored change rate of the pedal is not greater than the first threshold, the opening of the brake pedal is not greater than the second threshold, and the slip rate of the vehicle is not greater than the third threshold, it is then determined whether the mode set by the vehicle is the stable mode.

S705: Determine whether the mode set by the vehicle is an ECO mode, and if yes, S706 is performed, or if no, S707 is performed.

S706: Determine that the braking mode of the vehicle is the ECO mode.

S707: Determine that the vehicle is in a comfort mode.

In an optional embodiment, in this application, when mode setting information is second mode information (that is, the selected mode is a comfort mode), the method further includes: determining a maximum electric braking force that can be provided by a motor apparatus for a rear axle; determining a third target hydraulic pressure, where a fourth sum of a fifth hydraulic braking force generated by the third target hydraulic pressure on the front axle and a sixth hydraulic braking force generated by the third target hydraulic pressure on the rear axle is equal to a difference between the total braking force and the maximum electric braking force that can be provided for the rear axle; and controlling the hydraulic efficiency gear in the vehicle to provide the third target hydraulic pressure for the front axle and the rear axle, and provide the maximum electric braking force for the rear axle through the motor apparatus.

In other words, in this application, when the selected mode is the comfort mode, when it is ensured that the total braking force remains unchanged, the motor apparatus is used as much as possible to achieve the maximum electric braking force for the rear axle, and the hydraulic braking is enabled to ensure system stability as much as possible.

During specific implementation, the following steps may be included.

Step 1: Calculate the maximum electric braking force of the rear axle implemented by the motor apparatus based on a total braking force requirement, a rear axle motor capability limit, a battery capability limit, a rear axle vertical force, and a slope. It is assumed that the maximum electric braking force of the rear axle implemented by the motor apparatus is represented as $f_{rear\text{-}max}$.

Step 2: Based on a comparison between a current motor braking force and a total braking force requirement, an excess braking requirement is realized through hydraulic braking. Specifically, a required hydraulic pressure is represented as $p_{comfort\ mode\ compensation}$, and then:

$$p_{comfort\ mode\ compensation} = \frac{f_b - f_{rear\text{-}max}}{c_1 + c_2}$$

In this embodiment, it can be ensured that a maximum braking force is achieved by using a rear axle motor as much as possible when the total braking force remains unchanged, and this helps improve comfort of a driver during braking.

In an optional embodiment, in this application, the mode setting information may further include third mode information (that is, the selected mode is the comfort mode). The third mode information indicates that when the total braking force remains unchanged, a braking force provided by the motor apparatus for a front axle and a braking force provided by the motor apparatus for a rear axle as large as possible, to improve energy recovery efficiency.

During specific implementation, the following steps may be included.

Step 1: Determine, based on a vertical load of a front axle of the vehicle and a vertical load of a rear axle of the vehicle, a first braking force that needs to be allocated to the front axle and a second braking force that needs to be allocated to the rear axle.

For example, the total braking force is represented as $f_b$, the vertical load of the front axle during braking is represented as $f_{z1}$, the vertical load of the rear axle during braking is represented as $f_{z2}$, a first braking force is represented as $f_{b1}$, and a second braking force is represented as $f_{b2}$, then $$f_{b1} = \left(\frac{f_{z1}}{f_{z1} + f_{z2}}\right) * f_b, \text{ and } f_{b2} = \left(\frac{f_{z2}}{f_{z1} + f_{z2}}\right) * f_b.$$

Step 2: Based on the first braking force and the second braking force, the motor apparatus allocates the electric braking force of the front axle and the electric braking force of the rear axle.

Specifically, if the electric braking force of the front axle allocated by the motor apparatus is represented as $f_{electric\text{-}front\ axle}$, and the electric braking force of the rear axle allocated by the motor apparatus is represented as $f_{electric\text{-}rear\ axle}$, the following cases may occur.

If the electric braking force that can be allocated for the front axle and the electric braking force that can be allocated for the rear axle by the motor apparatus each are not limited by the motor capability, $$f_{electric\text{-}front\ axle} = f_{b1}, \text{ and } f_{electric\text{-}rear\ axle} = f_{b2}.$$

If the electric braking force that can be allocated by the motor apparatus for the front axle is limited by the capability of the motor apparatus and the electric braking force that can be allocated by the motor apparatus for the rear axle is not limited by the capability of the motor apparatus, and a maximum value of the electric braking force that can be allocated by the motor apparatus for the front axle is recorded as $f_{motor\text{-}front\ axle,max}$, $$f_{electric\text{-}front\ axle} = f_{electric\text{-}front\ axle,max}, \text{ and } f_{electric\text{-}rear\ axle} = f_b - f_{electric\text{-}front\ axle,max}.$$

If the electric braking force that can be allocated by the motor apparatus for the rear axle is limited by the capability of the motor apparatus and the electric braking force that can be allocated by the motor apparatus for the front axle is not limited by the capability of the motor apparatus, and a maximum value of the electric braking force that can be allocated by the motor apparatus for the rear axle is recorded as $f_{electric\text{-}real\ axle,\ max}$, $$f_{electric\text{-}rear\ axle} = f_{electric\text{-}rear\ axle,max}, \text{ and } f_{electric\text{-}front\ axle} = f_b - f_{electric\text{-}rear\ axle,max}.$$

If both the braking force that can be allocated for the front axle and the braking force that can be allocated for the rear axle by the motor apparatus are limited by the capability of the motor apparatus, $f_{electric\text{-}front\ axle}=f_{electric\text{-}front\ axle,\ max}$, and $f_{electric\text{-}rear\ axle}=f_{electric\text{-}rear\ axle,\ max}$. In addition, in this case, to ensure that the total braking force remains unchanged, the remaining braking force is compensated by using a hydraulic pressure. Specifically, if the compensated hydraulic pressure is recorded as $p_{economic\text{-}hydraulic\ compensation}$, $$p_{economic\text{-}hydraulic\ compensation} = \frac{f_b - f_{electric\text{-}front\ axle,max} - f_{electric\text{-}rear\ axle,max}}{c_1 + c_2}$$

In this embodiment, it can be ensured that the braking force of the front axle and the braking force of the rear axle provided by the motor apparatus are as large as possible when the total braking force remains unchanged, thereby improving energy recovery efficiency.

The foregoing describes how to implement the allocation of a front-axle braking force and a rear-axle braking force in the stable mode, the comfort mode and the ECO mode. It should be understood that, when the braking method provided in this application is specifically applied, coordination between the method provided in this application and another braking method (for example, a method for braking by an anti-lock braking system) should be further noted. The coordination may be considered as a moment at which the braking method in this application can be activated and a moment at which the braking method in this application needs to be exited.

Figure 8:
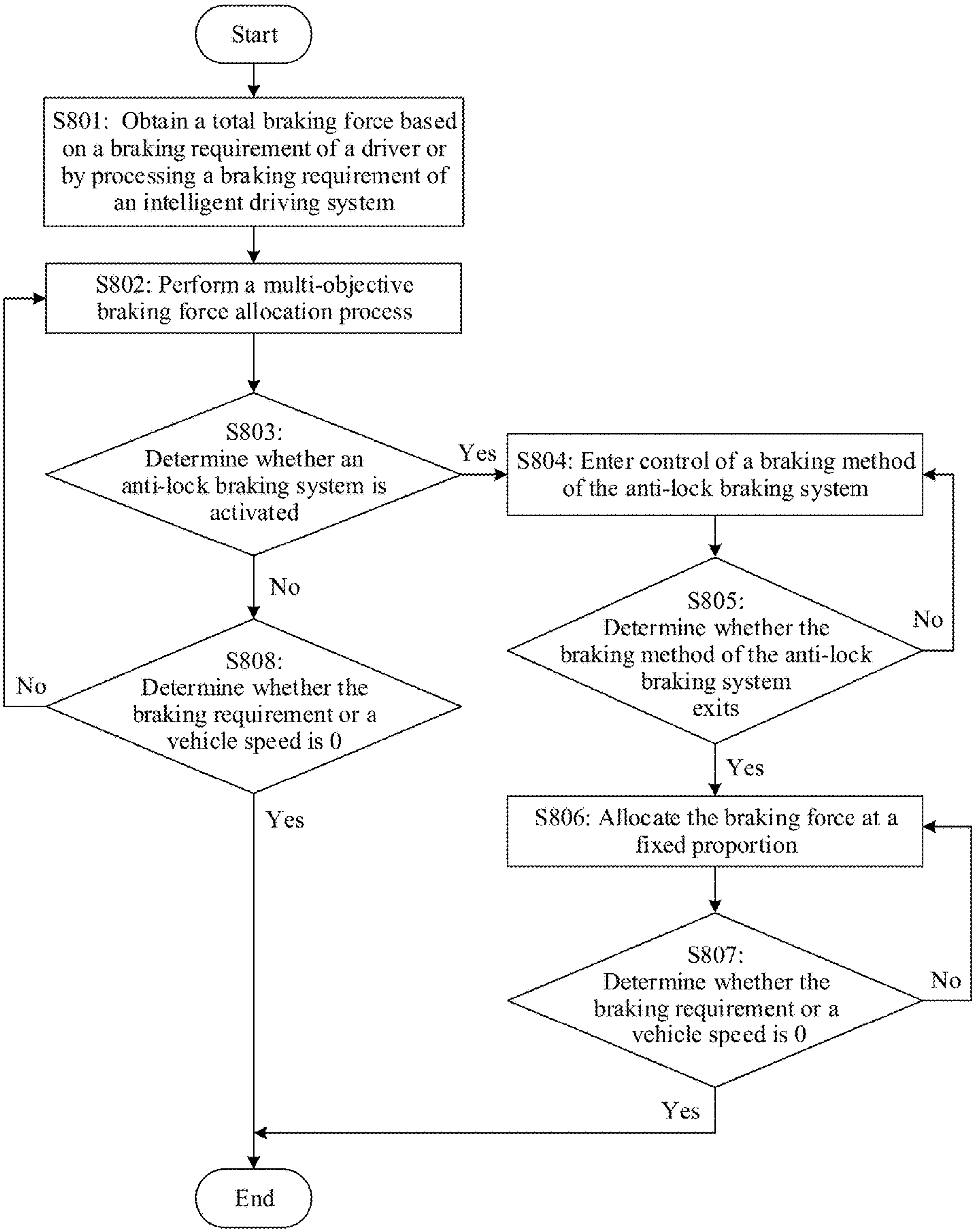
FIG. 8 is a schematic flowchart of activating and exiting a braking method according to an embodiment of this application.

For example, FIG. 8 is a schematic flowchart of activating and exiting a braking method according to an embodiment of this application. As shown in FIG. 8, after a driver steps a brake pedal or an intelligent driving system sends a braking instruction to start, execution starts based on the process shown in FIG. 8. The detailed process is described as follows.

S801: Obtain a total braking force based on a braking requirement of the driver or by processing a braking requirement of the intelligent driving system.

S802: Perform a multi-objective braking force allocation process.

The multi-objective braking force allocation process is a process of allocating a front-axle braking force and a rear-axle braking force in a stable mode, a process of allocating a front-axle braking force and a rear-axle braking force in a stable mode, or a process of allocating a front-axle braking force and a rear-axle braking force in an ECO mode that are described in the foregoing embodiments of this application. For a specific process, refer to the foregoing description. Details are not described herein again.

S803: Determine whether an anti-lock braking system is activated, and if the anti-lock braking system is activated, S804 is performed, or if the anti-lock braking system is not activated, S808 is performed.

S804: Enter control of a braking method of the anti-lock braking system.

The anti-lock braking system corresponds to a set of braking methods. The braking method may also be considered as a method for allocating a braking force of a front axle and a braking force of a rear axle.

S805: Determine whether the braking method of the anti-lock braking system exits; if the braking method exits, S806 is performed, or if the braking method does not exit, S804 continues to be performed.

S806: Allocate the braking force at a fixed proportion.

The fixed proportion allocation is: After the total braking force is determined, a hydraulic pressure required by the total braking force is calculated based on a friction coefficient of the front axle and a friction coefficient of the rear axle, and then the braking force of the front axle and the braking force of the rear axle are provided based on the hydraulic pressure.

S807: Determine whether the braking requirement or a vehicle speed is 0, and if the braking requirement or the vehicle speed is 0, end the braking process, or if the braking requirement or the vehicle speed is not 0, S806 continues to be performed.

S808: Determine whether the braking requirement or a vehicle speed is 0, and if the braking requirement or the vehicle speed is not 0, S802 is performed, or if the braking requirement or the vehicle speed is 0, end the braking process.

The foregoing describes in detail the braking method according to the embodiments of this application with reference to FIG. 5 to FIG. 8. The following describes in detail a braking apparatus according to the embodiments of this application with reference to FIG. 9 and FIG. 10.

Figure 9:
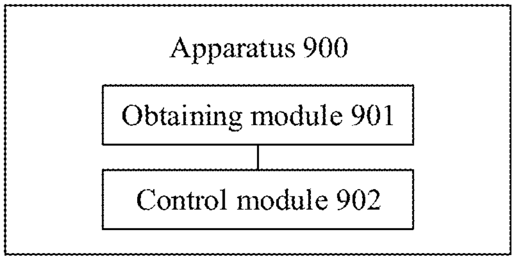
FIG. 9 is a schematic diagram of a structure of a braking apparatus according to an embodiment of this application.

FIG. 9 is a schematic diagram of a structure of a braking apparatus according to an embodiment of this application. Specifically, as shown in FIG. 9, the apparatus 900 includes: an obtaining module 901 and a control module 902. The apparatus 900 may be configured to implement the method in any of the foregoing method embodiments.

In an example, the obtaining module 901 may be configured to implement S501, and the control module 902 may be configured to implement S502.

In another example, the obtaining module 901 may be configured to implement S601, and the control module 902 may be configured to implement S602 to S606.

Figure 10:
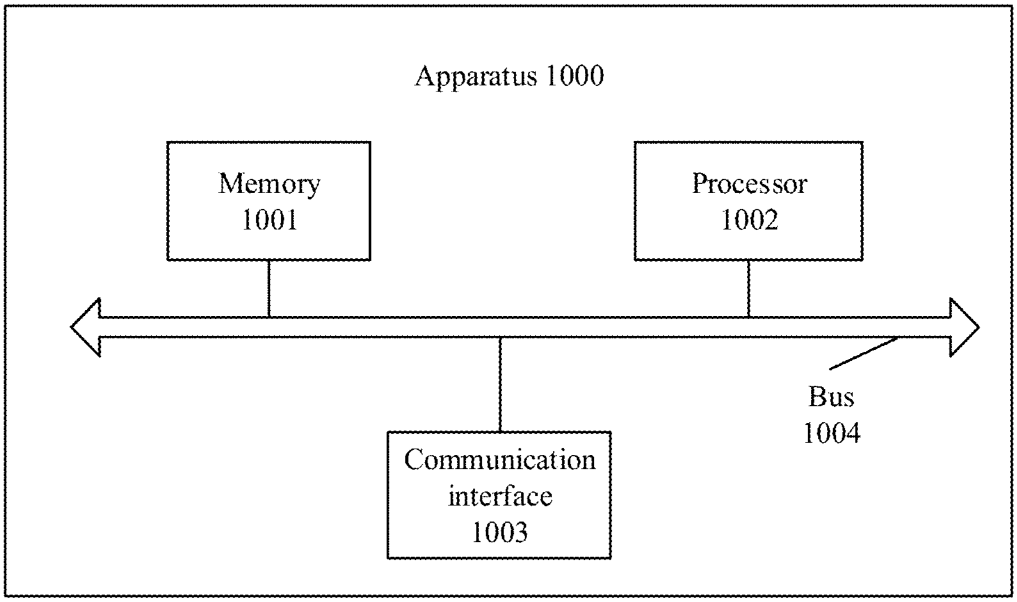
FIG. 10 is a schematic diagram of a structure of a braking apparatus according to another embodiment of this application.

FIG. 10 is a schematic diagram of a structure of a braking apparatus according to another embodiment of this application. The apparatus shown in FIG. 10 may be configured to perform the method described in any one of the foregoing embodiments.

As shown in FIG. 10, the apparatus 1000 in this embodiment includes: a memory 1001, a processor 1002, a communication interface 1003, and a bus 1004. The memory 1001, the processor 1002, and the communication interface 1003 are communicatively connected to each other through the bus 1004.

The memory 1001 may be a read-only memory (ROM), a static storage device, a dynamic storage device, or a random access memory (RAM). The memory 1001 may store a program. When the program stored in the memory 1001 is executed by the processor 1002, the processor 1002 is configured to perform the steps of the methods shown in FIG. 5 to FIG. 8.

The processor 1002 may be a general-purpose central processing unit (CPU), a microprocessor, an application-specific integrated circuit (ASIC), or one or more integrated circuits, configured to execute a related program, to implement the method shown in FIG. 5 to FIG. 8 of this application.

Alternatively, the processor 1002 may be an integrated circuit chip, and has a signal processing capability. In an implementation process, steps of the method in FIG. 5 to FIG. 8 in embodiments of this application may be completed by using an integrated logic circuit of hardware in the processor 1002 or instructions in a form of software.

Alternatively, the processor 1002 may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like.

Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1001. The processor 1002 reads information from the memory 1001, and completes, in combination with hardware of the processor 1002, functions that need to be performed by units included in the apparatuses in this application. For example, the processor 1002 may perform steps/functions in the embodiments shown in FIG. 5 to FIG. 8.

The communication interface 1003 may use, but not limited to, a transceiver apparatus of a transceiver type, to implement communication between the apparatus 1000 and another device or a communication network.

The bus 1004 may include a path for transmitting information between the components (for example, the memory 1001, the processor 1002, and the communication interface 1003) of the apparatus 1000.

It should be understood that the apparatus 1000 shown in this embodiment of this application may be an electronic device, or may be a chip configured in an electronic device.

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions or computer programs. When the computer instructions or the computer programs are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technologies, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A vehicle braking method applied to a vehicle, the method comprising:

obtaining a total braking force, wherein the total braking force is a braking force required for braking a vehicle; and controlling, based on the total braking force, a hydraulic efficiency gear in the vehicle to provide a same first target hydraulic pressure for a front axle and a rear axle, and controlling a motor apparatus in the vehicle to provide a first electric braking force for the front axle and a second electric braking force for the rear axle, wherein there is a difference between a first hydraulic braking force and a second hydraulic braking force due to inconsistent friction coefficients, wherein the first hydraulic braking force is generated by the same first target hydraulic pressure on the front axle, wherein the second hydraulic braking force is generated by the same first target hydraulic pressure on the rear axle, wherein the first electric braking force and the second electric braking force compensate for the difference between the first hydraulic braking force and the second hydraulic braking force;

wherein a sum of the first hydraulic braking force generated by the first target hydraulic pressure on the front axle, the second hydraulic braking force generated by the first target hydraulic pressure on the rear axle, the first electric braking force, and the second electric braking force is equal to the total braking force, and wherein a ratio of a first sum of the first hydraulic braking force and the first electric braking force to a second sum of the second hydraulic braking force and the second electric braking force is equal to a ratio of a first vertical load of the front axle of the vehicle to a second vertical load of the rear axle of the vehicle.

2. The method according to claim 1, wherein the first target hydraulic pressure is a smallest hydraulic pressure in a first hydraulic pressure and a second hydraulic pressure, wherein the first hydraulic pressure is a hydraulic pressure that needs to be provided by the hydraulic efficiency gear to enable the front axle to generate a first braking force, wherein the second hydraulic pressure is a hydraulic pressure that needs to be provided by the hydraulic efficiency gear to enable the rear axle to generate a second braking force, and wherein the first braking force and the second braking force are braking forces that need to be respectively allocated to the front axle and the rear axle based on the total braking force being allocated to the front axle and the rear axle based on the first vertical load and the second vertical load; and wherein an electric braking force provided by the motor apparatus for a first axle in the front axle and the rear axle is zero, and the first axle is an axle corresponding to the smallest hydraulic pressure.

3. The method according to claim 2, further comprising:

determining the first braking force that needs to be allocated to the front axle and the second braking force that needs to be allocated to the rear axle based on the total braking force being allocated to the front axle and the rear axle and based on the first vertical load and the second vertical load;

determining the first hydraulic pressure that needs to be provided by the hydraulic efficiency gear to enable the front axle to generate the first braking force;

determining the second hydraulic pressure that needs to be provided by the hydraulic efficiency gear to enable the rear axle to generate the second braking force;

determining the smallest hydraulic pressure in the first hydraulic pressure and the second hydraulic pressure as the first target hydraulic pressure;

determining a hydraulic braking force generated by a second axle in the front axle and the rear axle based on the hydraulic efficiency gear providing the first target hydraulic pressure for the second axle; and determining a difference between a braking force that needs to be allocated to the second axle in the total braking force and the hydraulic braking force generated by the second axle as a target electric braking force that the motor apparatus needs to provide for the second axle.

4. The method according to claim 3, wherein the controlling the hydraulic efficiency gear in the vehicle to provide the first target hydraulic pressure for the front axle and the rear axle, and controlling the motor apparatus in the vehicle to provide the first electric braking force for the front axle and the second electric braking force for the rear axle comprise:

based on a maximum electric braking force that the motor apparatus can provide for the second axle being greater than or equal to the target electric braking force, controlling the hydraulic efficiency gear in the vehicle to provide the first target hydraulic pressure for the front axle and the rear axle, and controlling the motor apparatus in the vehicle to provide the target electric braking force for the second axle.

5. The method according to claim 4, wherein based on the maximum electric braking force that the motor apparatus can provide for the second axle being less than the target electric braking force, the method further comprises:

determining a second target hydraulic pressure, wherein a third sum of a third hydraulic braking force generated by the second target hydraulic pressure on the front axle and a fourth hydraulic braking force generated by the second target hydraulic pressure on the rear axle is equal to a difference between the total braking force and the maximum electric braking force; and controlling the hydraulic efficiency gear in the vehicle to provide the second target hydraulic pressure for the front axle and the rear axle, and controlling the motor apparatus in the vehicle to provide the maximum electric braking force for the second axle.

6. The method according to claim 1, wherein the controlling, based on the total braking force, the hydraulic efficiency gear in the vehicle to provide the first target hydraulic pressure for the front axle and the rear axle, and controlling the motor apparatus in the vehicle to provide the first electric braking force for the front axle and the second electric braking force for the rear axle comprise:

based on a preset condition being met, controlling, further based on the total braking force, the hydraulic efficiency gear in the vehicle to provide the first target hydraulic pressure for the front axle and the rear axle, and controlling the motor apparatus in the vehicle to provide the first electric braking force for the front axle and the second electric braking force for the rear axle, and wherein the preset condition comprises: a change rate of a brake pedal in the vehicle is greater than a preset first threshold, an opening of the brake pedal is greater than a preset second threshold, and a slip rate of the vehicle is greater than a preset third threshold.

7. The method according to claim 1, wherein the controlling, based on the total braking force, the hydraulic efficiency gear in the vehicle to provide the first target hydraulic pressure for the front axle and the rear axle, and controlling the motor apparatus in the vehicle to provide the first electric braking force for the front axle and the second electric braking force for the rear axle comprises:

obtaining mode setting information in the vehicle, wherein the mode setting information comprises first mode information and/or second mode information, wherein the first mode information indicates that a ratio of a braking force of the front axle to a braking force of the rear axle is equal to a ratio of the first vertical load to the second vertical load based on the total braking force remaining unchanged, and wherein the second mode information indicates that the motor apparatus is enabled to provide a maximum electric braking force for the rear axle based on the total braking force remaining unchanged; and based on the mode setting information being the first mode information and the vehicle not meeting a preset condition, controlling, further based on the total braking force, the hydraulic efficiency gear in the vehicle to provide the first target hydraulic pressure for the front axle and the rear axle, and controlling the motor apparatus in the vehicle to provide the first electric braking force for the front axle and the second electric braking force for the rear axle, wherein the preset condition comprises any one or more of the following conditions: a change rate of a brake pedal in the vehicle is greater than a preset first threshold, an opening of the brake pedal is greater than a preset second threshold, or a slip rate of the vehicle is greater than a preset third threshold.

8. The method according to claim 7, wherein based on the mode setting information being the second mode information, the method further comprises:

determining a maximum electric braking force that can be provided by the motor apparatus for the rear axle;

determining a third target hydraulic pressure, wherein a fourth sum of a fifth hydraulic braking force generated by the third target hydraulic pressure on the front axle and a sixth hydraulic braking force generated by the third target hydraulic pressure on the rear axle is equal to a difference between the total braking force and the maximum electric braking force that can be provided for the rear axle; and controlling the hydraulic efficiency gear in the vehicle to provide the third target hydraulic pressure for the front axle and the rear axle, and providing the maximum electric braking force for the rear axle through the motor apparatus.

9. A vehicle braking apparatus, comprising:

a processor; and a memory coupled to the processor and having processor-executable instructions stored thereon, wherein the processor executes the processor-executable instructions and the vehicle braking apparatus is caused to:

obtain a total braking force, wherein the total braking force is a braking force required for braking a vehicle; and control, based on the total braking force, a hydraulic efficiency gear in the vehicle to provide a same first target hydraulic pressure for a front axle and a rear axle, and control a motor apparatus in the vehicle to provide a first electric braking force for the front axle and a second electric braking force for the rear axle, wherein there is a difference between a first hydraulic braking force and a second hydraulic braking force due to inconsistent friction coefficients, wherein the first hydraulic braking force is generated by the same first target hydraulic pressure on the front axle, wherein the second hydraulic braking force is generated by the same first target hydraulic pressure on the rear axle, wherein the first electric braking force and the second electric braking force compensate for the difference between the first hydraulic braking force and the second hydraulic braking force;

wherein a sum of the first hydraulic braking force generated by the first target hydraulic pressure on the front axle, the second hydraulic braking force generated by the first target hydraulic pressure on the rear axle, the first electric braking force, and the second electric braking force is equal to the total braking force, and wherein a ratio of a first sum of the first hydraulic braking force and the first electric braking force to a second sum of the second hydraulic braking force and the second electric braking force is equal to a ratio of a first vertical load of the front axle of the vehicle to a second vertical load of the rear axle of the vehicle.

10. The apparatus according to claim 9, wherein the first target hydraulic pressure is a smallest hydraulic pressure in a first hydraulic pressure and a second hydraulic pressure, wherein the first hydraulic pressure is a hydraulic pressure that needs to be provided by the hydraulic efficiency gear to enable the front axle to generate a first braking force, wherein the second hydraulic pressure is a hydraulic pressure that needs to be provided by the hydraulic efficiency gear to enable the rear axle to generate a second braking force, and wherein the first braking force and the second braking force are braking forces that need to be respectively allocated to the front axle and the rear axle based on the total braking force being allocated to the front axle and the rear axle and based on the first vertical load and the second vertical load; and wherein an electric braking force provided by the motor apparatus for a first axle in the front axle and the rear axle is zero, and the first axle is an axle corresponding to the smallest hydraulic pressure.

11. The apparatus according to claim 10, wherein the processor executes the processor-executable instructions and the vehicle braking apparatus is further caused to:

determine a first braking force that needs to be allocated to the front axle and a second braking force that needs to be allocated to the rear axle based on the total braking force being allocated to the front axle and the rear axle and based on the first vertical load and the second vertical load;

determine a first hydraulic pressure that needs to be provided by the hydraulic efficiency gear to enable the front axle to generate the first braking force;

determine a second hydraulic pressure that needs to be provided by the hydraulic efficiency gear to enable the rear axle to generate the second braking force;

determine the smallest hydraulic pressure in the first hydraulic pressure and the second hydraulic pressure as the first target hydraulic pressure;

determine a hydraulic braking force generated by a second axle in the front axle and the rear axle based on the hydraulic efficiency gear providing the first target hydraulic pressure for the second axle; and determine a difference between a braking force that needs to be allocated to the second axle in the total braking force and the hydraulic braking force generated by the second axle as a target electric braking force that the motor apparatus needs to provide for the second axle.

12. The apparatus according to claim 11, wherein the processor executes the processor-executable instructions and the vehicle braking apparatus is further caused to:

based on a maximum electric braking force that the motor apparatus can provide for the second axle being greater than or equal to the target electric braking force, control the hydraulic efficiency gear in the vehicle to provide the first target hydraulic pressure for the front axle and the rear axle, and control the motor apparatus in the vehicle to provide the target electric braking force for the second axle.

13. The apparatus according to claim 12, wherein based on the maximum electric braking force that the motor apparatus can provide for the second axle being less than the target electric braking force, the processor executes the processor-executable instructions and the vehicle braking apparatus is further caused to:

determine a second target hydraulic pressure, wherein a third sum of a third hydraulic braking force generated by the second target hydraulic pressure on the front axle and a fourth hydraulic braking force generated by the second target hydraulic pressure on the rear axle is equal to a difference between the total braking force and the maximum electric braking force; and control the hydraulic efficiency gear in the vehicle to provide the second target hydraulic pressure for the front axle and the rear axle, and control the motor apparatus in the vehicle to provide the maximum electric braking force for the second axle.

14. The apparatus according to claim 9, wherein the processor executes the processor-executable instructions and the vehicle braking apparatus is further caused to:

based on a preset condition being met, control, further based on the total braking force, the hydraulic efficiency gear in the vehicle to provide the first target hydraulic pressure for the front axle and the rear axle, and control the motor apparatus in the vehicle to provide the first electric braking force for the front axle and the second electric braking force for the rear axle, and wherein the preset condition comprises: a change rate of a brake pedal in the vehicle is greater than a preset first threshold, an opening of the brake pedal is greater than a preset second threshold, and a slip rate of the vehicle is greater than a preset third threshold.

15. The apparatus according to claim 9, wherein the processor executes the processor-executable instructions and the vehicle braking apparatus is further caused to:

obtain mode setting information in the vehicle, wherein the mode setting information comprises first mode information and/or second mode information, the first mode information indicates that a ratio of a braking force of the front axle to a braking force of the rear axle is equal to a ratio of the first vertical load to the second vertical load based on the total braking force remaining unchanged, and the second mode information indicates that the motor apparatus is enabled to provide a maximum electric braking force for the rear axle based on the total braking force remaining unchanged; and based on the mode setting information being the first mode information and the vehicle not meeting a preset condition, control, further based on the total braking force, the hydraulic efficiency gear in the vehicle to provide the first target hydraulic pressure for the front axle and the rear axle, and control the motor apparatus in the vehicle to provide the first electric braking force for the front axle and the second electric braking force for the rear axle, wherein the preset condition comprises any one or more of the following conditions: a change rate of a brake pedal in the vehicle is greater than a preset first threshold, an opening of the brake pedal is greater than a preset second threshold, and a slip rate of the vehicle is greater than a preset third threshold.

16. The apparatus according to claim 15, wherein based on the mode setting information being the second mode information, the processor executes the processor-executable instructions and the vehicle braking apparatus is further caused to:

determine a maximum electric braking force that can be provided by the motor apparatus for the rear axle;

determine a third target hydraulic pressure, wherein a fourth sum of a fifth hydraulic braking force generated by the third target hydraulic pressure on the front axle and a sixth hydraulic braking force generated by the third target hydraulic pressure on the rear axle is equal to a difference between the total braking force and the maximum electric braking force that can be provided for the rear axle; and control the hydraulic efficiency gear in the vehicle to provide the third target hydraulic pressure for the front axle and the rear axle, and provide the maximum electric braking force for the rear axle through the motor apparatus.

17. A non-transitory computer-readable medium, wherein the computer-readable medium stores program code for execution by a computer, and the program code comprises instructions for performing a vehicle braking method comprising:

obtaining a total braking force, wherein the total braking force is a braking force required for braking a vehicle; and controlling, based on the total braking force, a hydraulic efficiency gear in the vehicle to provide a same first target hydraulic pressure for a front axle and a rear axle, and controlling a motor apparatus in the vehicle to provide a first electric braking force for the front axle and a second electric braking force for the rear axle, wherein there is a difference between a first hydraulic braking force and a second hydraulic braking force due to inconsistent friction coefficients, wherein the first hydraulic braking force is generated by the same first target hydraulic pressure on the front axle, wherein the second hydraulic braking force is generated by the same first target hydraulic pressure on the rear axle, wherein the first electric braking force and the second electric braking force compensate for the difference between the first hydraulic braking force and the second hydraulic braking force;

wherein a sum of the first hydraulic braking force generated by the first target hydraulic pressure on the front axle, the second hydraulic braking force generated by the first target hydraulic pressure on the rear axle, the first electric braking force, and the second electric braking force is equal to the total braking force, and wherein a ratio of a first sum of the first hydraulic braking force and the first electric braking force to a second sum of the second hydraulic braking force and the second electric braking force is equal to a ratio of a first vertical load of the front axle of the vehicle to a second vertical load of the rear axle of the vehicle.

18. The non-transitory computer-readable medium according to claim 17, wherein the first target hydraulic pressure is a smallest hydraulic pressure in a first hydraulic pressure and a second hydraulic pressure, wherein the first hydraulic pressure is a hydraulic pressure that needs to be provided by the hydraulic efficiency gear to enable the front axle to generate a first braking force, wherein the second hydraulic pressure is a hydraulic pressure that needs to be provided by the hydraulic efficiency gear to enable the rear axle to generate a second braking force, and wherein the first braking force and the second braking force are braking forces that need to be respectively allocated to the front axle and the rear axle based on the total braking force being allocated to the front axle and the rear axle and based on the first vertical load and the second vertical load; and wherein an electric braking force provided by the motor apparatus for a first axle in the front axle and the rear axle is zero, and the first axle is an axle corresponding to the smallest hydraulic pressure.

19. The non-transitory computer-readable medium according to claim 18, wherein the method further comprises:

determining the first braking force that needs to be allocated to the front axle and the second braking force that needs to be allocated to the rear axle based on the total braking force being allocated to the front axle and the rear axle and based on the first vertical load and the second vertical load;

determining the first hydraulic pressure that needs to be provided by the hydraulic efficiency gear to enable the front axle to generate the first braking force;

determining the second hydraulic pressure that needs to be provided by the hydraulic efficiency gear to enable the rear axle to generate the second braking force;

determining the smallest hydraulic pressure in the first hydraulic pressure and the second hydraulic pressure as the first target hydraulic pressure;

determining a hydraulic braking force generated by a second axle in the front axle and the rear axle based on the hydraulic efficiency gear providing the first target hydraulic pressure for the second axle; and determining a difference between a braking force that needs to be allocated to the second axle in the total braking force and the hydraulic braking force generated by the second axle as a target electric braking force that the motor apparatus needs to provide for the second axle.

20. The non-transitory computer-readable medium according to claim 19, wherein the controlling the hydraulic efficiency gear in the vehicle to provide the first target hydraulic pressure for the front axle and the rear axle, and controlling the motor apparatus in the vehicle to provide the first electric braking force for the front axle and the second electric braking force for the rear axle comprise:

based on a maximum electric braking force that the motor apparatus can provide for the second axle being greater than or equal to the target electric braking force, controlling the hydraulic efficiency gear in the vehicle to provide the first target hydraulic pressure for the front axle and the rear axle, and controlling the motor apparatus in the vehicle to provide the target electric braking force for the second axle.

* * * * *